(12) United States Patent
Valencia et al.

(10) Patent No.: US 8,017,158 B2
(45) Date of Patent: Sep. 13, 2011

(54) GRANULATED FERTILIZER COMPOSED OF MICRONUTRIENTS AND CLAY

(76) Inventors: Jose Luis Miranda Valencia, Guanajuato (MX); Gustavo Rebora Gonzalez, Guanajuato (MX)

( * ) Notice: Subject to any disclaimer, the term of this patent is extended or adjusted under 35 U.S.C. 154(b) by 1418 days.

(21) Appl. No.: 10/530,222

(22) PCT Filed: Oct. 16, 2002

(86) PCT No.: PCT/MX02/00098
§ 371 (c)(1),
(2), (4) Date: Jul. 31, 2006

(87) PCT Pub. No.: WO2004/035507
PCT Pub. Date: Apr. 29, 2004

(65) Prior Publication Data
US 2007/0119222 A1 May 31, 2007

(51) Int. Cl.
*A01N 59/20* (2006.01)
*A01N 59/16* (2006.01)
*A01N 59/02* (2006.01)
*A61K 33/32* (2006.01)
*A61K 33/26* (2006.01)

(52) U.S. Cl. ........ 424/630; 424/639; 424/641; 424/646; 424/703; 71/31; 71/63

(58) Field of Classification Search .................. None
See application file for complete search history.

(56) References Cited

U.S. PATENT DOCUMENTS 4,219,349 A * 8/1980 Bardsley ............... 71/62
4,334,906 A * 6/1982 Young ................... 71/33

FOREIGN PATENT DOCUMENTS

WO    WO 9428699    * 12/1994

* cited by examiner

*Primary Examiner* — Alton N Pryor
(74) *Attorney, Agent, or Firm* — Rosenberg, Klein & Lee

(57) ABSTRACT

The invention consists of a granulated fertilizer which contains iron (11 to 13%), zinc (3 to 9%), manganese (0.1 to 2.5%), copper (0.5 to 0.7%), in the form of sulphates, also ammonium molybdate (0 to 0.1%) and a Caolinite, Illite or Montmorillonite clay (45 to 57%), or a mixture of them in any proportion. All the percentages by weight are based on the total weight of the fertilizer. The product is 100% soluble, the high cationic exchange capacity which clays have allows the micronutrients to be adsorbed by the clay and prevent its leaching or reacting, making its assimilation by the plant more efficient and better. The use of sulphates in the soil, in the presence of water provoks an acidification of the soil which allows a better assimilation of the micronutrients in alkaline soils.

19 Claims, No Drawings

GRANULATED FERTILIZER COMPOSED OF MICRONUTRIENTS AND CLAY

FIELD OF TECHNOLOGY

The present invention refers to granulated fertilizer which contains as a support material a clay to which the following micronutrients have been added, iron, zinc, manganese, copper, sulphur and molybdenum, and which is therefore more easily assimilated by crops.

STATE OF THE ART

Within the field of agriculture mankind has realized that the adequate use of fertilizers results in obtaining larger production. Within the essential nutrients in plants there exist those which are necessary in very small amounts called micronutrients (iron, zinc, copper, manganese, molybdenum y boron), which are as important as the macronutrients (nitrogen, phosphorus and potassium). Although they are present in small amounts, the lack of any micronutrient will limit the plant's growth even when it has all other nutrients in adequate amounts. The presence of clay makes not only the dissolution of the micronutrients to adequate concentrations which may be assimilated by the plant possible, but also the presence of charges in the (micronutrients and clay) results in a the absorption being carried out with an adequate efficiency.

The role of each one of these micronutrients has been long studied, iron plays an important role as a catalyst for reactions of chlorophyll formation since it works as an oxygen transporter and its deficiency causes chlorosis on the plant's leaves. Zinc is necessary for the synthesis of substances responsible for the plant's growth as well as for systems of enzymes such as dehydrogenase, proteinase and peptidase. Its deficiency brings with it problems such as bad growth and whitish chlorosis. Manganese's primary function is to form part of a system of enzymes in plants. Copper is necessary for the formation of chlorophyll and catalyzes several reactions in the plant. (Soil Fertility Manual, Potash and Phosphate Institute, Revised Printing 1992, chapter 7). It is not enough only to have the micronutrients, an appropriate proportion is also necessary for proper assimilation. In some cases an excess of one of these results in a deficiency of another. (J. J. Mortvedt, P. M. Giordano, W. L. Lindsay, Micronutrients in Agriculture, AGT editor S. A., 1982, pages 282-286). For these reasons, it is known that the use of fertilizers containing micronutrients in adequate proportion is necessary in soils which lack any one of them. The above has been visualized by experts in the fields of application and proof of that is the development of fertilizers which carry micronutrients, in the case of U.S. Pat. No. 4,328,025, wherein the importance of providing them in adequate amounts is pointed out. Finding an adequate proportion of micronutrients is not enough, it is also important to find a way of supplying them to the plant in an economic and efficient way, as in the case of U.S. Pat. Nos. 5,366,533 y 4,334,906. In the first patent, the case of the mixture of organic by-products of citric fruits and the iron micronutrient is presented, in the second one, the use of porose sulphurose particles as a vehicle of transport for micronutrients. These mixtures bring as a consequence a better way of supplying the micronutrients to the crops and thus obtaining a better assimilation of the same; although these are not the only ways of making them assimilable to the plants.

In order to prevent the micronutrients which are applied to the soil through the use of fertilizers from reacting forming compounds which prevent their assimilation, it is necessary for them to be in soils where a high capacity of cationic exchange exists. This is not always possible and sometimes when they are applied they reach the plant in very small amounts or not at all because they have reacted and become non-assimilable compounds. This brings on the necessity of using larger amounts of fertilizer and thus turning out more expensive and in the long run the soil may become toxic. It must be remembered that the cationic exchange capacity (CEC) is the capacity the soil has to store and exchange cations, this exchange takes place in the plant's roots and in this way the micronutrient is assimilated.

Taking into account all of the above, the development of a granulated fertilizer which contains micronutrients in adequate amounts, which are supported by a material with a high CEC, of controlled solubility and which also allows for an easy, dosified and efficient application of the micronutrients at a low cost is described in this patent.

THE REVELATION OF THE INVENTION

The present invention consists on the development of a product which contains iron, zinc, manganese, copper, molybdenum, sulphur and a mixture of clays, wherein their concentrations are iron from 11% to 13%, zinc from 3% to 9%, manganese from 0.1% to 2.5%, copper from 0.5% to 0.7%, molybdenum from 0% to 0.1%, sulphur from 7% to 10%, and from 45% to 57% of clays. The percentages by weight are based on the total weight of the fertilizer; wherein iron is present as monohydrated iron sulphate, zinc as monohydrated zinc sulfate, manganese as monohydrated manganese sulphate, copper as heptahidrated copper sulphate, molybdenum as tetrahidrated ammonium molybdate, and the clay can be caolinite, illite, montmorillonite or a mixture of any of them in any concentration.

The presentation of the product is in granulated form of 1.5 to 4.5 millimeters, an adequate size to be used directly or mixed with other fertilizers. Its hardness is from 1.9 to 2.3 Kg/cm2, enough to bare the subsequent handling, during the fertilizer's preparation and the mixture with other nutrients. The processing conditions make the material withstand handling during preparation. Upon being mixed with other nutrients it suffers a slight degradation to dust y has also the capacity of being 100% soluble, a characteristic which allows it to reach the plant's roots.

The relationship in which the micronutrients are found is highly important when talking about fertilizers, for example, excess Cu, Mn or Zn could induce a Fe deficiency; but at the same time, Mn to a certain degree helps Fe be assimilated. (J. J. Mortvedt, P. M. Giordano, W. L. Lindsay, Micronutrients in Agriculture, AGT editor S. A., 1982, pages 282-286). This is why the proportions in which the micronutrients are present in this granulated fertilizer have been developed based on the experience with the use of fertilizers and are a very important factor for its efficiency. Another important aspect of the fertilizer is its low pH. The low pH is due to the effect of small cations of copper, iron, molybdenum and manganese, which upon contact with water; break this molecule, generating hydrogen ions which are responsible for acidity. This characteristic is unique to small ions. According to the literature (Raymond Chang, fourth ed., page 687, mc graw-hill, 1992). This presents itself as an advantage in alkaline soils since the acidic character of fertilizers (3.5-5 pH) results in the micronutrients being assimilated by the plant more easily in soils which have the problem of being alkaline.

This is due to the fact that one of the major problems of alkaline soils is the availability of cations such as $Fe^{++}$, $Zn^{++}$, $Cu^{++}$ and $Mn^{++}$, since augmenting the pH diminishes the cation availability. This low availability is due to the fact that when the pH is increased over 5.0, the larger part of the cations start to precipitate as hydrated oxides (hydroxides), which have a very low solubility constant and are therefore practically insoluble. That is why it is convenient that the cultivation fields have a neutral or slightly acidic pH and that they are acidified in case of being alkaline.

Another, also very important, characteristic of the material is managed due to the use of clays as a support to the micronutrients. Caolinite, illite, montmorillonite clays, or a mixture of them is used as a support material, which thanks to their charges tend to unite upon being moisturized. A binding agent is also used, in low concentration, which strengthens the bond between particles, allowing a certain degree of porosity which makes the loss of moisture easier. The binding agent consists of calcium oxide which in the presence of water is turned into calcium hydroxide, which due to pH, and in accordance with literature in the field, forms positively charged hidroxo-complexes which are adsorbed over the clay's surface. The adsorption of the hidroxo-complexes modifies the clay's particle's net surface charge, causing the formation of juncture points with other clay particles.

During the fertilizer's application, the dissociation of cations takes place, and these due to the charge of the clays are adsorbed. It is necessary to point out that the clays have a cationic exchange capacity of 10 to 150 milliequivalents/100 g. due to their negative charge. This helps the very clay retain the $Fe^{++}$, $Zn^{++}$, $M^{++}$ and $Cu^{++}$ cations and allows them to be exchanged for $H^+$ cations which are found on the surface of the plant's roots. Due to this, the mixture of materials is turned into a highly assimilable fertilizer.

It is to be said that although the clay mixed with the zinc, manganese, copper and iron sulphates and ammonium molybdate has a certain capacity of bonding, the use of a bonding agent such as calcium oxide is essential to confer a greater hardness to the pellet between 1.9 and 2.3 $Kg/cm^2$ so that it will not be turned to dust when mixed with other fertilizers and facilitate it's application. The fertilizer has a low moisture concentration (2 to 6%) which allows it to be mixed also with hygroscopic fertilizers such as urea, up to a 1 to 1 ratio, without problems which may affect it's physical characteristics.

Another advantage the developed product has is that due to the progressive dissolution of its components it is allowed to act during the greatest part of the crop cycle; in other words, upon contact with water its components dissolve gradually.

IMPROVED METHOD FOR CARRYING OUT THE INVENTION

Example 1

To produce a ton of the granulated fertilizer, 180 Kg. of monohydrated iron sulphate is mixed with 215 Kg. of monohydrated zinc sulfate, 28 Kg. of heptahidrated copper sulphate, 5 Kg. of monohydrated manganese sulfate, 1 Kg. of tetrahidrated ammonium molybdate and 570 Kg. of pulverized caolinite clay until a homogeneous mixture is obtained. In another recipient 1 Kg. of calcium oxide is mixed with 260 liters of water, until a homogeneous mixture is obtained. The mixture of monohydrated zinc sulfate, heptahidrated copper sulphate, monohydrated iron sulphate, monohydrated manganese sulfate, and tetrahidrated ammonium molybdate and montmorillonite and caolinite clays is emptied onto a pelletizing plate with a flux of 12.5 Kg/min. The plate has a diameter of 1.8 m, with a slant degree of 37° and spins at 38 rpm. The mixture on the plate is sprayed with the water and calcium hydroxide mixture with a flow of 1.25 Lt/min. The pellets formed are fed into a 3 section rotating oven heated by a burner fed with a mixture of hydrocarbons, predominantly methane. On the inside, the oven reaches a temperature of 90° C. in the first section, same which diminishes to 40° in the last section, to obtain a final moisture content of the product of around 3%. The fertilizer pellets are then sifted through the woven mesh of openings 1.5 mm (woven mesh 8) and 4.5 mm (woven mesh 5).

The product which passes through the woven mesh 5 and is caught by the woven mesh 8 is a product of 1.5 to 4.5 mm in diameter which is ready to be packed and distributed. The smaller sizes which go through the woven mesh 8 are fed back into the mixer and re-processed. The larges sizes are ground and then are also re-processed being fed back into the mixer.

The granulated fertilizer obtained can be applied from 20 to 40 Kg./Ha in vegetable patches and 100 gr/tree in the case of fruit trees on soils where the established crops have low levels of fertility and an alkaline pH.

Example 2

To produce a ton of the granulated fertilizer, 180 Kg. of monohydrated iron sulphate is mixed with 215 Kg. of monohydrated zinc sulfate, 28 Kg. of heptahidrated copper sulphate, 5 Kg. of monohydrated manganese sulfate and 571 Kg. of pulverized caolinite and montmorillonite clays in a 2:1 ratio, until a homogeneous mixture is obtained. In another recipient 1 Kg. of calcium oxide is mixed with 260 liters of water, until a homogeneous mixture is obtained. The mixture of monohydrated zinc sulfate, heptahidrated copper sulphate, monohydrated iron sulphate, monohydrated manganese sulfate, and tetrahidrated ammonium molybdate and montmorillonite and caolinite clays is emptied on a pelletizing plate with a flux of 12.5 Kg/min. The plate has a diameter of 1.8 m, with a slant degree of 37° and spins at 38 rpm. The mixture on the plate is sprayed with the water and calcium hydroxide mixture with a flow of 3.25 Lt/min. the pellets formed are fed into a 3 section rotating oven heated by a burner fed with a mixture of hydrocarbons, predominantly methane. On the inside, the oven reaches a temperature of 90° C. in the first section, same which diminishes to 40° in the last section, to obtain a final moisture of the product of around 3%. The fertilizer pellets are then sifted through the woven mesh of openings 1.5 mm (woven mesh 8) and 4.5 mm (woven mesh 5).

The product which passes through the woven mesh 5 and is caught by the woven mesh 8 is a product of 1.5 to 4.5 mm in diameter which is ready to be packed and distributed. The smaller sizes which go through the woven mesh 8 are fed back into the mixer and re-processed. The larges sizes are ground and then are also re-processed being fed back into the mixer.

The granulated fertilizer obtained can be applied from 20 to 40 Kg./Ha in vegetable patches and 100 gr/tree in the case of fruit trees on soils where the established crops have low levels of fertility and an alkaline pH.

What is claimed is:

1. A granulated fertilizer comprising a mixture of 45 to 57 wt. % of clay, 11 to 13 wt. % of iron, 3 to 9 wt. % of zinc, 0.1 to 2.5 wt. % of manganese, 0.5 to 0.7 wt. % of copper, 0 to 0.1 wt. % of molybdenum, 7 to 10 wt. % of sulphur, and 0.05 to 0.3 wt. % of a bonding agent, the mixture being formed into pellets having a size in a range of 1.5 to 4.5 millimeters.

2. A granulated fertilizer according to claim 1, wherein said iron is monohydrated iron sulphate or heptahidrated iron sulphate.

3. A granulated fertilizer according to claim 1, wherein said zinc is monohydrated zinc sulphate.

4. A granulated fertilizer according to claim 1, wherein said manganese is monohydrated manganese sulphate.

5. A granulated fertilizer according to claim 1, wherein said copper is heptahidrated copper sulphate.

6. A granulated fertilizer according to claim 1, wherein said molybdenum is tetrahidrated ammonium molybdate.

7. A granulated fertilizer according to claim 1, wherein said clay is selected from the group consisting of caolinite, illite or a mixture thereof.

8. A granulated fertilizer according to claim 7, wherein said mixture of clays contains from 0 to 15% iron, based on a total weight of the mixture of clays.

9. A granulated fertilizer according to claim 1, wherein said bonding agent includes calcium oxide.

10. A granulated fertilizer according to claim 1, wherein said pellets are 100% soluble in water, in a period of approximately 30 minutes at a temperature of 25° C.

11. A granulated fertilizer according to claim 1, wherein said granulated fertilizer has a pH of 3.5 to 5.

12. A granulated fertilizer according to claim 1, wherein said granulated fertilizer has a moisture of 2 to 6%.

13. A granulated fertilizer according to claim 1, wherein said granulated fertilizer has a hardness of 1.9 to 2.3 Kg/cm2.

14. A granulated fertilizer according to claim 9, wherein said calcium oxide is mixed with water to form calcium hydroxide, and said granulated fertilizer has a pH of 3.5 to 5.

15. A granulated fertilizer according to claim 1, wherein said clay is formed of caolinite.

16. A granulated fertilizer according to claim 1, wherein said clay is formed of illite.

17. A method for preparing a fertilizer, comprising the steps of:

mixing iron sulphate, zinc sulphate, copper sulphate, manganese sulphate, ammonium molybdate and 45 to 57 wt. % of a pulverized clay formed of one of illite, caolinite or a mixture thereof until a homogeneous mixture is obtained to provide 11 to 13 wt. % of iron, 3 to 9 wt. % of zinc, 0.5 to 0.7 wt. % of copper, 0.1 to 2.5 wt. % of manganese, 0 to 0.1 wt. % of molybdenum and 7.0 to 10 wt. % sulphur as micronutrients;

feeding said mixture onto a pelletizing plate;

spraying a bonding agent in the form of a mixture of water and calcium oxide to mix with said mixture on said pelletizing plate;

feeding formed pellets into a drying oven to reduce a moisture content thereof; and sifting the dried pellets to obtain pellets having a size range of 1.5 to 4.5 millimeters.

18. The method according to claim 17, wherein the feeding formed pellets into a drying oven includes drying the formed pellets in an oven wherein temperatures vary from 90° C. to 40° C.

19. A granulated fertilizer comprising a mixture of 45 to 57 wt. % of a pulverized clay formed of caolinite, 11 to 13 wt. % of iron, 3 to 9 wt. % of zinc, 0.1 to 2.5 wt. % of manganese, 0.5 to 0.7 wt. % of copper, 0 to 0.1 wt. % of molybdenum, 7 to 10 wt. % of sulphur, and calcium hydroxide as a bonding agent, and said mixture having a pH of 3.5 to 5.

\* \* \* \* \*